Oct. 1, 1929.　　　O. R. HAUGE　　　1,729,872
LICENSE CERTIFICATE HOLDER FOR MOTOR VEHICLES
Filed Sept. 8, 1928
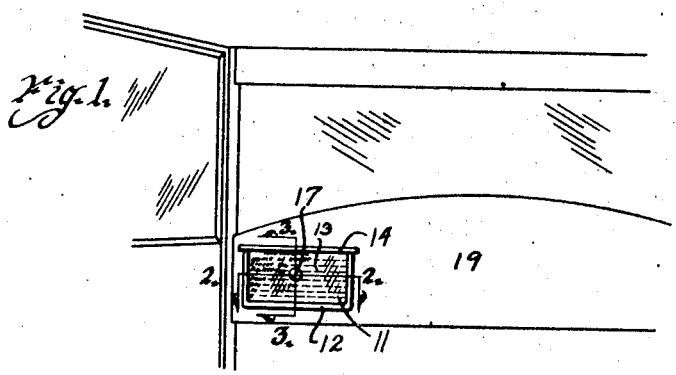
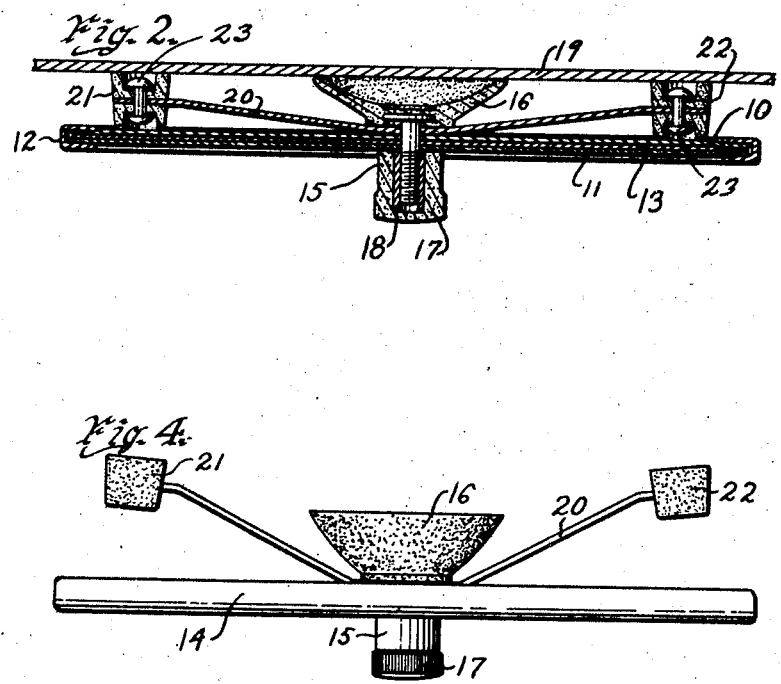
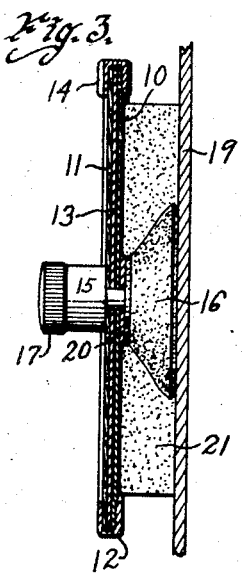
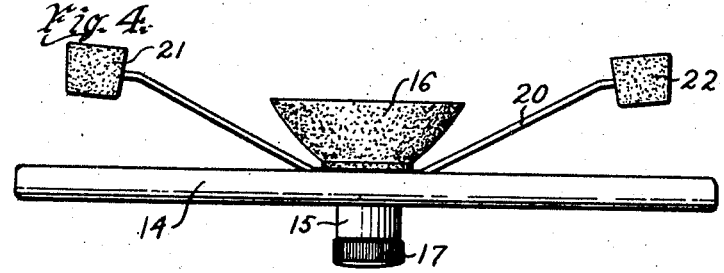
Inventor
Obie R. Hauge
by Bair, Freeman & Sinclair
Attorneys
Witness
D E Bovey Patented Oct. 1, 1929

1,729,872

UNITED STATES PATENT OFFICE

OBIE R. HAUGE, OF ELLSWORTH TOWNSHIP, HAMILTON COUNTY, IOWA

LICENSE-CERTIFICATE HOLDER FOR MOTOR VEHICLES

Application filed September 8, 1928. Serial No. 304,702.

The object of this invention is to provide an improved holder for license certificates of motor vehicles and other similar cards which it is desired to mount or display in suitable location.

Still another object of the invention is to provide an improved holder for license certificates which may be mounted on the instrument board of a vehicle without the use of bolts, screws or other similar fastening means.

Still another object is to provide a device of the character described which is simple, economical and useful for the purpose described.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is an interior view of a portion of a motor vehicle showing my improved holder mounted in position for practical use.

Figure 2 is a horizontal section on an enlarged scale on the line 2—2 of Figure 1.

Figure 3 is a vertical section on the line 3—3 of Figure 1.

Figure 4 is a plan view of the device detached from its support.

The holder comprises a container of familiar form having a relatively rigid rear wall 10 and a transparent front wall 11. The rear wall 10 and front wall 11 are held together by a channel-shaped frame 12 which surrounds three margins, preferably the lower margin and two side margins.

This leaves the holder open at the top for insertion of a card or license certificate such as 13, which may be read through the transparent forward wall. A removable cap 14 of channel shape is mounted over the top of the holder to protect the certificate or card 13 and to complete the marginal border provided by the frame 12.

The elements thus far described are common and well known and constitute a holder which is in use at the present time. My improvement consists in a method of mounting the holder on the motor vehicle or in any desired location without the use of bolts, screws or similar securing means.

A threaded stud 15 is mounted through the rear wall 10 and front wall 11 and also penetrates the certificate or card 13 when the latter member is in place in the holder. The stud 15 preferably is mounted approximately at the center of the frame or holder and its head is at the rear side and carries a suction or vacuum cup 16.

A knob 17 contains a threaded sleeve 18 adapted to be screwed on the projecting forward end of the stud 15. The holding means is applied to the device by inserting the stud 15 through holes in the rear wall 10 and forward wall 11 and causing it to penetrate the certificate or card 13 after the same has been mounted in place. Then, the knob 17 is screwed on the forward end of the stud, which serves to hold it in place with the knob contacting the front wall of the device and the suction cup 16 held against the rear wall.

The knob 17 is also useful as a handle for lifting and applying the device and this operation is accomplished by pressing the suction cup 16 firmly against the surface to which it is applied, such as the instrument board 19 of a vehicle. Thus, pressure may be applied manually through the knob 17 to cause the suction cup 16 to adhere firmly to the surface of the member 19 and if desired, moisture may first be applied to the rim of the cup to assist in holding it in place.

In order to furnish supports for the end portions of the holder and to hold such end portions in properly spaced relation to the surface of the member 19, I have provided an arm 20 which extends lengthwise of the rear side of the holder and is carried by the stud 15.

At the respective ends of the arm 20 are transverse cushion members 21 and 22, which may be secured to the arm by means of rivets 23. The cushion members 21 and 22 are designed to fill the space between the ends of the holder and the adjacent surface of the member 19 to prevent oscillation of the holder and to maintain it in proper position.

It is obvious that I have provided an efficient holding means for a registration certificate or the like, which is inexpensive and which can be readily applied to a smooth surface of the vehicle and which will be effective in holding the certificate in the desired place where it may be displayed to conform to provisions of law or police regulations.

I claim as my invention:

1. A holder of the character described, comprising a frame having a transparent front wall and a rigid rear wall, a threaded stud extending through said walls, a suction cup carried by the rear end of said stud, and a threaded member removably mounted on the forward end of said stud to hold it in place relative to the frame and also to permit the application of pressure to said suction cup.

2. A holder of the character described, comprising a frame having a transparent front wall and a rigid rear wall, a threaded stud extending through said walls, a suction cup carried by the rear end of said stud, a threaded member removably mounted on the forward end of said stud to hold it in place relative to the frame and also to permit the application of pressure to said suction cup, and cushion members arranged near the ends of said frame or contact with a surface to which said suction cup is applied.

3. A holder of the character described, comprising a frame having a transparent front wall and a rigid rear wall, a threaded stud extending through said walls, a suction cup carried by the rear end of said stud, a threaded member removably mounted on the forward end of said stud to hold it in place relative to the frame and also to permit the application of pressure to said suction cup, an arm extending longitudinally at the rear side of said frame, and a cushion member at each end of said arm for contact with a surface to which said suction cup is applied.

Des Moines, Iowa, June 29, 1928.

OBIE R. HAUGE.